US010281576B2

(12) United States Patent
DePasqua

(10) Patent No.: US 10,281,576 B2
(45) Date of Patent: May 7, 2019

(54) SONAR NAVIGATION SYSTEM AND METHOD

(71) Applicant: Garmin Switzerland GmbH, Schaffhausen (CH)

(72) Inventor: Louis DePasqua, Round Lake Beach, IL (US)

(73) Assignee: Garmin Switzerland GmbH (CH)

( * ) Notice: Subject to any disclaimer, the term of this patent is extended or adjusted under 35 U.S.C. 154(b) by 0 days.

(21) Appl. No.: 14/528,317

(22) Filed: Oct. 30, 2014

(65) Prior Publication Data
US 2015/0063059 A1 Mar. 5, 2015

Related U.S. Application Data

(63) Continuation of application No. 13/652,438, filed on Oct. 15, 2012, now Pat. No. 8,879,359, which is a (Continued)

(51) Int. Cl.
*G01S 15/06* (2006.01)
*G01S 7/52* (2006.01)
(Continued)

(52) U.S. Cl.
CPC ............... *G01S 15/06* (2013.01); *G01S 7/52* (2013.01); *G01S 7/52004* (2013.01);
(Continued)

(58) Field of Classification Search
CPC .... G01S 7/52004; G01S 15/025; G01S 15/42; G01S 15/8902; G01S 15/96; G01S 15/06;
(Continued)

(56) References Cited

U.S. PATENT DOCUMENTS 2,429,774 A * 10/1947 Schultz et al. .................. 310/66
3,880,106 A * 4/1975 Farmer .......................... 440/113
(Continued)

OTHER PUBLICATIONS

Hummingbird, "Trolling Motor Mounted Transducer", 2007, pp. 1-2.

*Primary Examiner* — Assres H Woldemaryam
(74) *Attorney, Agent, or Firm* — Samuel M. Korte; Max M. Ali

(57) ABSTRACT

A method for pre-determining an underwater objects GPS position using a rotatable scan sonar unit linked to a boat, magnetic compass and GPS receiver. This system determines the underwater objects GPS position using the objects distance, compass heading and a GPS receiver/sonar on a boat. This system will provide real time longitude and latitude positions of underwater objects seen with sonar at a distance from a boat, and will allow for precise autopilot navigation or fixed position fishing. The system can also be used to correct for GPS errors when using previously stored waypoints positions of an object. The computer determines an objects underwater GPS position using a sonar transducer and mounted on a 360 degree movable mechanism such as a trolling motor unit, or phased array of transducers and a compass to provide heading information and formulates the objects position based on the distance and heading of the object in relation to the boats current GPS position.

12 Claims, 3 Drawing Sheets

Related U.S. Application Data continuation of application No. 12/537,887, filed on Aug. 7, 2009, now Pat. No. 8,305,844.

(60) Provisional application No. 61/087,098, filed on Aug. 7, 2008.

(51) Int. Cl.

| | | |
|---|---|---|
| *G01S 15/02* | (2006.01) | |
| *G01S 15/42* | (2006.01) | |
| *G01S 15/89* | (2006.01) | |
| *G01S 15/96* | (2006.01) | |
| *G01S 7/56* | (2006.01) | |

(52) U.S. Cl.
CPC ............ *G01S 7/52053* (2013.01); *G01S 7/56* (2013.01); *G01S 15/02* (2013.01); *G01S 15/025* (2013.01); *G01S 15/42* (2013.01); *G01S 15/89* (2013.01); *G01S 15/8902* (2013.01); *G01S 15/96* (2013.01)

(58) Field of Classification Search
CPC ... G01S 7/52; G01S 7/56; G01S 15/02; G01S 15/89; G01S 7/52053
USPC .................. 367/87, 99, 107, 115, 103, 110; 356/3.01–3.1, 4.01–4.1, 5.01–5.15
See application file for complete search history.

(56) References Cited

U.S. PATENT DOCUMENTS

| | | | |
|---|---|---|---|
| 3,989,216 A * | 11/1976 | Veatch | 248/278.1 |
| 4,152,690 A * | 5/1979 | Veatch | 367/191 |
| 4,561,076 A * | 12/1985 | Gritsch | 367/88 |
| 4,935,906 A * | 6/1990 | Baker et al. | 367/111 |
| 4,980,872 A * | 12/1990 | Oler et al. | 367/173 |
| 5,088,068 A * | 2/1992 | Schaill et al. | 367/173 |
| 5,169,349 A * | 12/1992 | Hilbert | 440/6 |
| 5,483,767 A * | 1/1996 | Langer | 43/4 |
| 5,537,380 A | 7/1996 | Sprankle et al. | |
| 5,568,152 A | 10/1996 | Janky et al. | |
| 5,581,518 A * | 12/1996 | Schaefer | 367/188 |
| 5,859,517 A * | 1/1999 | DePasqua | 318/581 |
| 5,967,863 A * | 10/1999 | Marchant | 440/6 |
| 6,431,923 B1 * | 8/2002 | Knight et al. | 440/6 |
| 6,667,934 B1 * | 12/2003 | Healey | 367/4 |
| 6,870,793 B2 * | 3/2005 | Ishihara et al. | 367/104 |
| 7,036,451 B1 * | 5/2006 | Hutchinson | B63B 17/00 114/364 |
| 7,163,427 B1 * | 1/2007 | Lee | 440/6 |
| 7,453,769 B2 * | 11/2008 | Kirschner et al. | 367/99 |
| 7,542,376 B1 * | 6/2009 | Thompson et al. | 367/104 |
| 8,203,909 B1 * | 6/2012 | Hickling | 367/88 |
| 8,300,499 B2 * | 10/2012 | Coleman et al. | 367/88 |
| 8,305,844 B2 | 11/2012 | DePasqua | |
| 8,879,359 B2 * | 11/2014 | DePasqua | 367/103 |
| 2003/0235112 A1 | 12/2003 | Zimmerman | |
| 2004/0027919 A1 * | 2/2004 | Erikson | 367/88 |
| 2004/0227484 A1 * | 11/2004 | DePasqua | 318/588 |
| 2005/0020150 A1 * | 1/2005 | Bernloehr | B63H 20/007 440/58 |
| 2006/0007784 A1 * | 1/2006 | Lerro et al. | 367/98 |
| 2006/0089794 A1 * | 4/2006 | DePasqua | G01C 21/203 701/532 |
| 2008/0121165 A1 * | 5/2008 | Lambertus et al. | 114/338 |
| 2009/0147623 A1 | 6/2009 | Betts et al. | |
| 2009/0271054 A1 * | 10/2009 | Dokken | 701/21 |
| 2010/0014386 A1 | 1/2010 | Thompson et al. | |
| 2010/0103775 A1 | 4/2010 | Betts et al. | |

* cited by examiner

SONAR NAVIGATION SYSTEM AND METHOD

CROSS-REFERENCE TO RELATED APPLICATIONS

This application is a continuation application of U.S. patent application Ser. No. 13/652,438, filed Oct. 15, 2012, which is a continuation application of U.S. patent application Ser. No. 12/537,887, filed Aug. 7, 2009 entitled SONAR NAVIGATION SYSTEM AND METHOD, which claims priority to U.S. Provisional Application No. 61/087,098, filed Aug. 7, 2008 entitled SONAR NAVIGATION SYSTEM AND METHOD, all of which are incorporated by reference in their entirety.

FIELD OF THE INVENTION

The present invention relates to sonar navigation systems. In particular, the present invention relates to a system and method for storing and/or recalling coordinates of the location of underwater objects.

SUMMARY OF THE INVENTION

Sonar units are an important tool for fisherman on a boat sonar units provide the user water depth, structure and fish location. The sonar transducer is used to send echo signals to determine the position of an object and the distance to the object in the water. The sonar transducer can be mounted in several different boat locations including transom mount, through hull or mounted on the lower unit of an electric trolling motor providing multi directional pointing of the sonar echo beam. The sonar transducer can also be mounted in different configurations including, side scan, forward scan, backward scan and down scan viewing of objects in many directions in the water. With the ability to scan in multiple directions the fisherman can cast to objects in the water without getting to close to scare the fish off of these objects. The objects in the water may be in the form of submerged trees, rocks, boats, fish cribs and many other underwater objects. Sonar units may also have built in GPS receivers used to show the boats position or previously stored GPS waypoint positions showing structure found in the lake that fish like to hide in. Some sonar units have the ability to side scan large areas of water showing objects on the bottom of the lake, and are capable of marking these objects position based upon GPS data stored at the time of the sonar side scanning. The user can freeze the sonar display screen and cursor to the previously viewed object on the screen and mark or store the GPS position to use later for navigation to the object. These side scan systems require the boat to be moving to determine the compass heading using the GPS movement to calculate the heading. There is a need for accurately determining an object's GPS location if the boat is in a fixed position. Using a compass mechanically in line with the pointing direction of the sonar beam allows for an improved method for determining the GPS position of an object in the water. This sonar/compass configuration is mounted on a 360-degree movable mechanism allowing for sweeping or scanning of a large area while the boat is in a fixed position or moving.

As such, the present invention is directed towards an improved method for determining the GPS position of an object in the water up to hundreds of feet or more away from the boat. This is done with aid of long range side scan sonar technology and by mounting a side/forward scan sonar transducer to the lower unit of an electric trolling motor. The fisherman can then direct the sonar beam by slowly spinning/steering the trolling motor lower unit, scanning the lake bottom 360 degrees and hundreds of feet from the boat. This system works whether the boat is moving or standing still. The sonar computer continuously stores compass heading, distance, and current GPS position as the lake bottom is scanned. The user can select any object (current or past view) on the screen to determine the GPS position of that object and use the GPS data to navigate the boat or correct previously stored object positions as a form of GPS error correction. The system determines the GPS position of objects with the aid of a compass linked or inline with the sonar transducers scannmg direction and pointing device (trolling motor) that may be in the form of a steerable trolling motor connected to a sonar unit. The GPS position is calculated by the sonar computer knowing the distance the object is from the boat and the compass heading direction pointing to the object. The computer then reads the boat's current longitude and latitude position and formulates the object's position using the distance and compass direction to the object. The underwater object GPS position data can be used for the boat's auto pilot navigation to guide the boat to the under water object. The user can set a distance parameter keeping the boat within a set distance away from the object, allowing the fisherman to cast to the object but keeping a far enough distance not to scare off the fish hiding in the object. The system may also incorporate a wind detection device to properly keep the boat pointing into the wind allowing for accurate boat navigation. The forward/side scan sonar transducer may be attached to the trolling motor lower with a removable bracket or may be manufactured permanently into the trolling motor lower unit casing.

In another embodiment, the system may incorporate sonar using a 360-degree view showing the bottom of the lake all the way around the boat. This system will control the turning speed of the sonar transducer by spinning the trolling motor steering motor at a specific rotation speed, this speed can be measured by a feedback position sensor on the motor or by using the compass heading data measuring the degree of movement over time. As the transducer spins the lake bottom is scanned and the image is drawn on the sonar screen. A stand-alone motorized mechanical spinning transducer device can also be used to replace the trolling motor as a turning mechanism. Another configuration of a 360 degree scanning system my incorporate a fixed position hull mounted phase array electronic scanning transducer with compass. This system uses the same object detection method described above to determine GPS waypoint positions of objects around the boat using a fixed boat mounted compass module.

In another embodiment the compass module that is mounted in the trolling motor may be used as a direction pointer and is coupled to the sonar unit for directing the map view image on the sonar screen. This system will allow the user to rotate the navigation map image 360 degrees around showing what direction (heading) the boat should go to navigate to a GPS waypoint. The waypoint may be underwater objects like trees, rocks and other submerged objects. This method will be very helpful to the user as it will give a good visual understanding of the current pointing position of the trolling motor head in relation to marked waypoints and objects in the water. Current sonar units require the boat to be moving to acquire a compass heading using GPS generated headings. This system is unique, as the trolling motor pointing heading direction will automatically control the view of the map on the sonar without the need for the boat to be moving to acquire a compass heading.

Other aspects of the present invention will become apparent and be more fully understood from the following detailed description and accompanying drawings, which set forth illustrative embodiments that are indicative of some of the various ways in which the principals of the invention may be employed.

DETAILED DESCRIPTION

The description that follows describes, illustrates and exemplifies one or more particular embodiments of the present invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claims, either literally or under the doctrine of equivalents.

Figure 1:
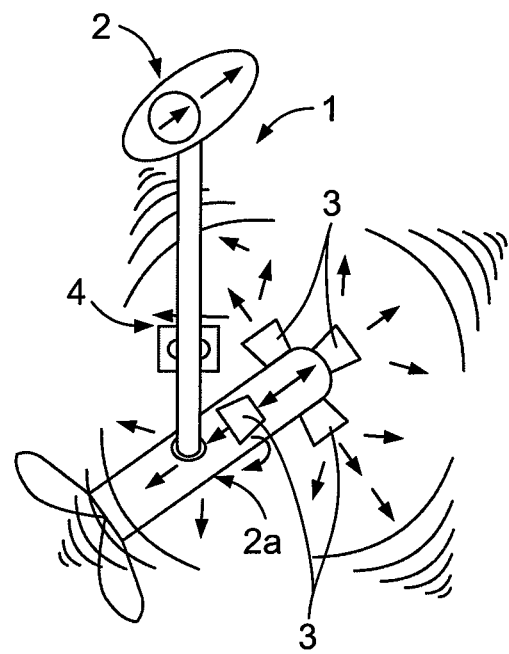
FIG. 1 is a diagram showing the trolling motor with a compass and a transducer.

FIG. 1 shows an electric trolling motor 1 equipped with a compass module 2 built into the top of the motor head. The lower unit 2a has a four directional sonar transducers 3, 6 at the front of the lower unit. The transducers can send sonar beams forward, backward and the left and right to the sides. The compass 2 is in line with the transducer allowing the system to measure the heading direction of the sonar beams. This is significant in detecting the underwater objects position in relation to the trolling motors pointing direction. This distance and heading are significant in calculating the GPS position of the object in the water. Steering motor 4 is used to turn the motor and sweep the waters around the boat searching for objects like submerged structure, weeds, trees, rocks, cribs, weed lines and fish.

Figure 2:
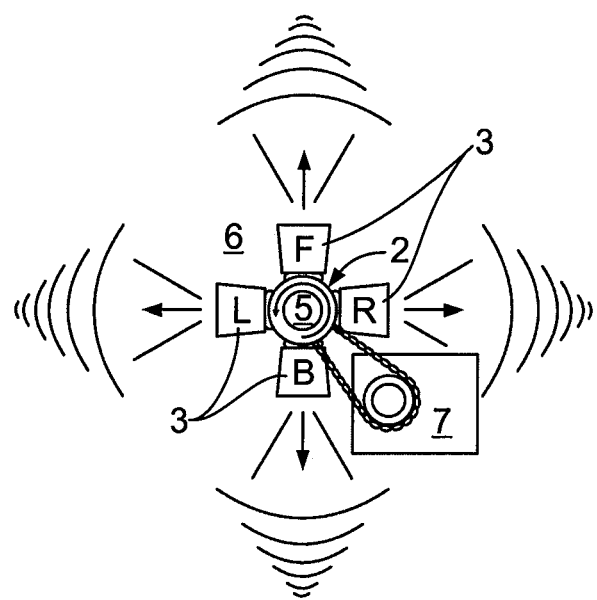
FIG. 2 is a diagram showing the transducer coupled to a motor for 360 degree positioning.

FIG. 2 is a stand alone steering device using steering motor 7 to direct the sonar transducers 3, 6 in the desired direction scanning for underwater objects. Compass 5 is used to know the heading an object is located at. This device can be a stand alone pointing unit that may be mounted directly to the bottom of the boat. This eliminates the need for an electric trolling motor to position the sonar scanning beam.

Figure 3:
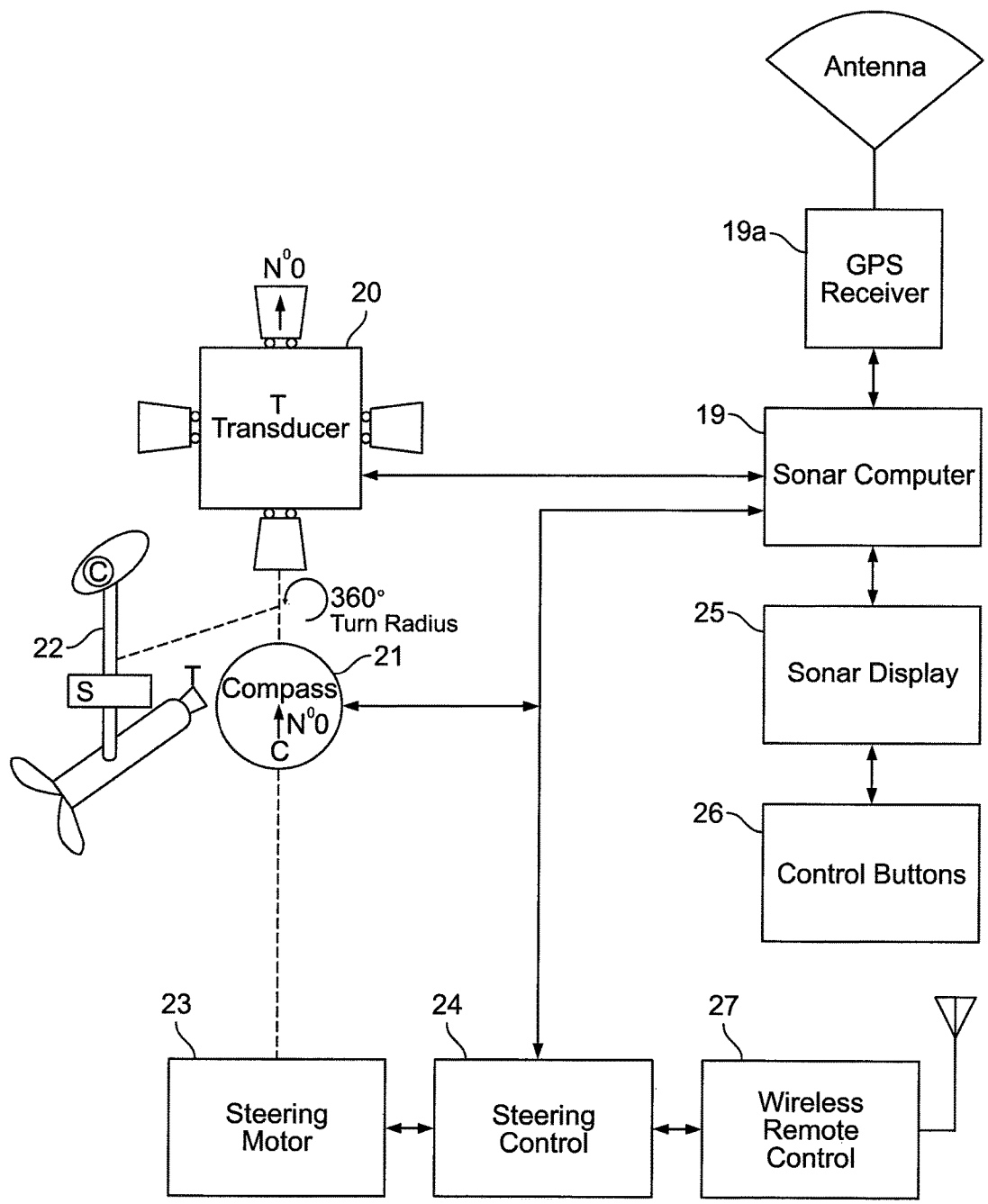
FIG. 3 is a block diagram of the sonar system.

FIG. 3 is a block diagram showing the trolling motor transducer 20, compass 21, and steering motor 23 connected to the sonar computer system 19. The pointing direction of the trolling motor can be controlled by the sonar computer via steering control 24 and can be used to provide 360 degree circle scanning or can be controlled by an external wireless remote control steering device 27. This external steering remote may also have a slow speed steering option to allow for variable speed turning of the trolling motor, to sweep the lake bottom in detail. Sonar transducer 20 is mechanically linked and in line with the compass module 21 with trolling motor 22. The compass data is passed to the sonar computer 19 and provides heading data used to formulate the GPS longitude and latitude of an object seen in the water by the sonar. The transducer 20 transmits sonar echoes in the water allowing the sonar computer 19 to create an image on the display that represents the lake bottom. The sonar computer also stores compass heading, GPS position and distance information along with the sonar images. This information can be used later to mark a waypoint location of an object. The user can select objects on the sonar display 25 via a cursor or touch display LCD. Once an object or location is selected on the display, the computer 19 uses the previously stored information to generate the selected objects GPS waypoint position. To formulate the GPS longitude and latitude of a selected point, location or object, the computer uses the current or stored position of the boat via the GPS receiver 19a and the heading/pointing direction of the sonar beam, with the distance to that location/object to formulate the desired GPS longitude and latitude.

One example of a set of formulas that may be useful to generate the desired latitude and longitude coordinates for this position is set forth below. These formulas also take into account the earth's circumference, although this is not necessary for short distances used with this system, as follows:

lat a sin(sin(lat 1)*cos(d)+cos(lat 1)*sin(d)*cos(tc))

dlon a tan 2(sin(tc)*sin(d)*cos(lat1),cos(d)−sin(lat 1)*sin(lat))

lon mod(lon1−dlon+pi,2*pi)−pi

Where a angle; lat1/lon 1 current position; d distance; tc circumference.

Sonar computer 19 can be programmed using C or Assembly language software to process this formula, and can also use a RISC style microprocessor, such as can be provided by MICROCHIP (Chandler, Ariz.) Eighteen (18) series microprocessor. The computer 19 can also use the newly formulated GPS position of an object to correct for GPS errors knowing that a previously marked waypoint is being viewed near this position. The user can correct the position of the previously stored waypoint by highlighting the old waypoint and pressing a correction button on the sonar control module 26. The user could also use this reference object to correct all waypoints stored on the lake. Sonar display 25 provides images of underwater objects along with navigational map views. The control buttons 26 are used to program and operate the sonar system. The trolling motor seen in FIG. 3 also provides the user a view of an object while navigated towards that object. This can be accomplished when using a forward scan transducer in conjunction with the compass and autopilot navigation system. This navigation system allows the sonar unit to control the navigation by reading the compass heading 12 from the trolling motor 22 and controlling the steering via the trolling motor steering control 24. The user can also offset the compass 12 positions to help view the object while navigating toward it. The offsetting of the compass can be manually done via a remote control device 27 or can be offset using the sonar controls 26.

The sonar system seen in FIG. 3 is also capable of keeping the boat at a specified distance from the boat. The user can select how many feet they would like the boat to be away from an object and the GPS navigation system will keep the boat within that distance. This will be useful while fishing as the fisherman may want to stay away from an object to keep from chasing the fish away do to the fisherman's presents.

Figure 4:
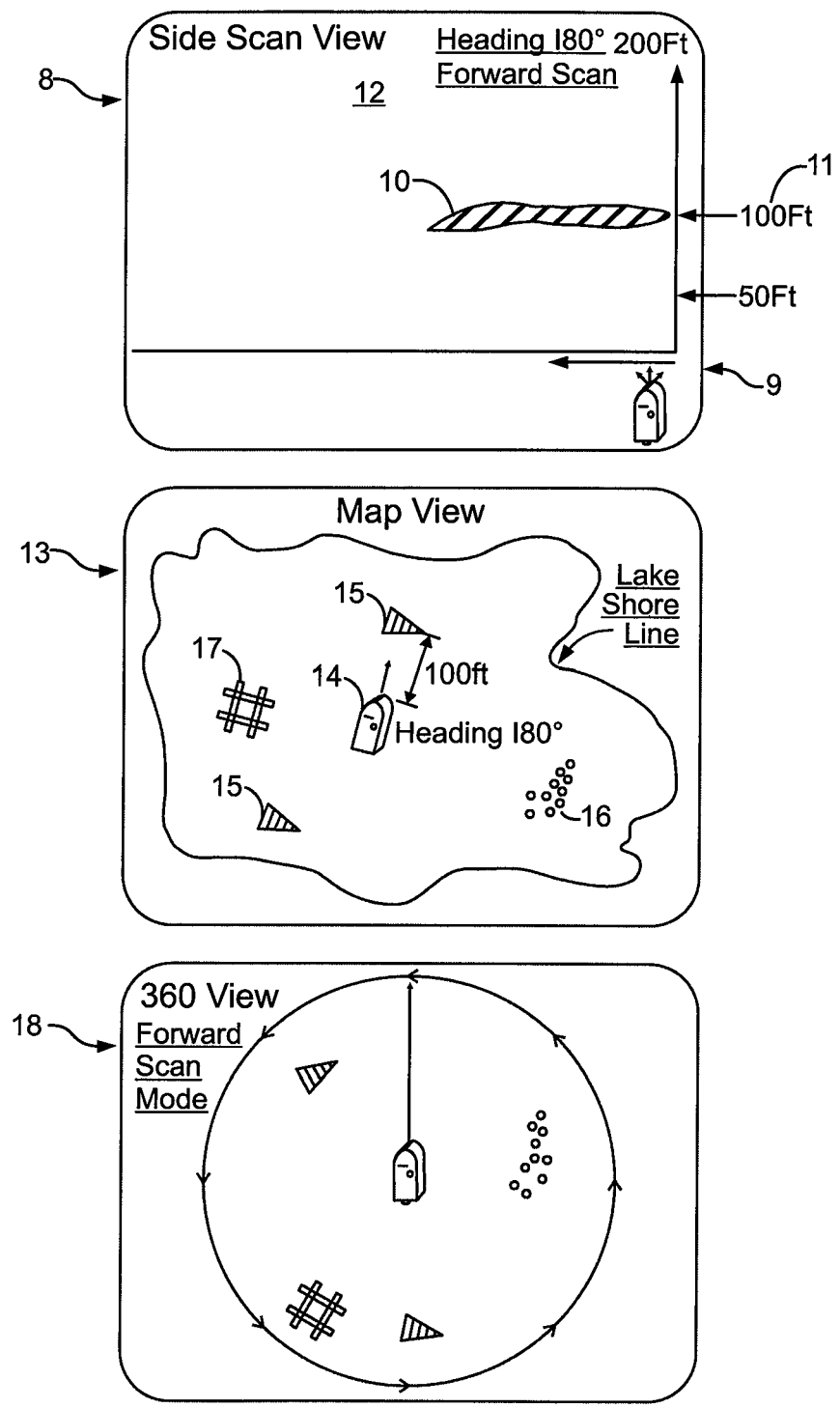
FIG. 4 is a diagram showing various sonar display views.

FIG. 4 diagram shows the display views of the sonar unit 25. Display view 8 shows a forward scan image of the boat 9 scanning the water up to 200 feet. An object 10 can be seen 100 feet away from the boat 11. This object is located 180 degrees in line with the head of the trolling motor unit compass 2. This display view may be used to select any direction of the trolling motor (forward, backward or left and right side scan). In anyone of these views the compass 21 can provide the direction of an object in the water. The display may also provide multiple views with split view mode. Display view 13 shows a map style image of the lake and position of the boat 14 in relation to the objects 15, 16, 17, in the water. Because the compass 21 is connected to the sonar computer 19, the view of the map in relation to the boat will be true to the pointing position of the trolling motor head pointing direction. This is significant as the user may want to direct the boat to a previously stored waypoint or object and can do so by simply turning the trolling motor head into the direction of the object seen on the display. The sonar display has the option to reposition the boat's icon position or turn the complete display image so the pointing direction can be seen at the top of the display. This means the display will rotate in relation to the pointed position. Most sonars use a GPS generated compass heading that does not operate when the boat is standing still and the boat's or trolling motor's pointing position does not match the image on the screen. That is only one of the benefits of having a compass mounted in the trolling motor head and connected to the sonar GPS system.

Sonar image 18 shows a 360 degree image of the bottom of the lake around the boat. This image is drawn by the sonar precisely spinning the transducer slowly around and creating an image. The compass heading can be used to set the turning speed of the transducer assembly by measuring the amount of movement in degrees over time. As the motor turns and the image is created, the compass heading and GPS position of the boat is stored allowing for object position selecting when the scan is complete.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A sonar system comprising:
   a motorized mechanical spinning side scan sonar transducer;
   a feedback position sensor coupled to the sonar transducer; and
   a sonar computer system that generates a circular sonar image on a sonar display using information from the sonar transducer and sonar transducer feedback position sensor in response to a circular sweeping motion of the motorized mechanical sonar transducer.

2. The sonar system of claim 1, wherein the feedback position sensor measures the position of the transducer.

3. The sonar system of claim 1, wherein the feedback position sensor measures the sonar transducer rotation speed.

4. The sonar system of claim 1, wherein the motorized mechanical spinning sonar transducer is mounted onto an electric trolling motor.

5. The sonar system of claim 1, wherein the motorized mechanical spinning sonar transducer is mounted onto a bow of a boat.

6. The sonar system of claim 1, wherein the motorized mechanical spinning sonar transducer is mounted onto a hull of a boat.

7. The sonar system of claim 1, wherein the motorized mechanical spinning sonar transducer includes multiple directional sonar transducers.

8. A sonar system comprising:
   a side scan sonar transducer mounted to a lower unit of an electric trolling motor;
   a feedback position sensor coupled to the sonar transducer; and
   a sonar computer system that generates a circular sonar image on a sonar display using information from the sonar transducer and sonar transducer feedback position sensor in response to a circular sweeping motion of the lower unit of the electric trolling motor.

9. The sonar system of claim 8, wherein the feedback position sensor measures the position of the transducer.

10. The sonar system of claim 8, wherein the feedback position sensor measures the sonar transducer rotation speed.

11. The sonar system of claim 8, wherein the side scan sonar transducer is mounted onto an electric steer trolling motor lower unit.

12. The sonar system of claim 8, wherein the side scan sonar transducer includes multiple directional sonar transducers.

* * * * *